(12) United States Patent
Ishimura et al.

(10) Patent No.: US 6,672,685 B2
(45) Date of Patent: Jan. 6, 2004

(54) BRAKE STROKE SIMULATOR AND A VEHICLE HYDRAULIC BRAKE APPARATUS PROVIDED WITH THE SAME

(75) Inventors: Junji Ishimura, Toyota (JP); Akihito Kusano, Toyota (JP); Yasuo Konishi, Toyoake (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 10/108,415

(22) Filed: Mar. 29, 2002

(65) Prior Publication Data

US 2002/0140286 A1 Oct. 3, 2002

(30) Foreign Application Priority Data

Mar. 29, 2001 (JP) ........................................ 2001-097107

(51) Int. Cl.[7] ................................................ B60T 8/34
(52) U.S. Cl. .............................. 303/113.4; 303/DIG. 11
(58) Field of Search ........................... 303/113.4, 114.1, 303/DIG. 11; 188/359

(56) References Cited

U.S. PATENT DOCUMENTS

| | | | | |
|---|---|---|---|---|
| 4,730,877 A | * | 3/1988 | Seibert et al. | ................ 303/52 |
| 5,038,564 A | * | 8/1991 | Horiuchi et al. | ............... 60/555 |
| 5,150,951 A | * | 9/1992 | Leiber et al. | ................ 303/186 |
| 5,326,158 A | * | 7/1994 | Ohori et al. | ................... 303/3 |
| 6,139,119 A | * | 10/2000 | Otomo | ..................... 303/113.1 |
| 6,203,117 B1 | * | 3/2001 | Starr et al. | ..................... 303/87 |
| 6,309,032 B1 | * | 10/2001 | Kusano et al. | ........... 303/116.1 |
| 6,312,062 B1 | * | 11/2001 | Hashida | ................... 303/113.2 |

FOREIGN PATENT DOCUMENTS

JP 3-45456 A 2/1991

* cited by examiner

*Primary Examiner*—Jack Lavinder
*Assistant Examiner*—Benjamin A Pezzlo
(74) *Attorney, Agent, or Firm*—Burns, Doane, Swecker & Mathis, LLP

(57) ABSTRACT

A brake stroke simulator includes a first movable member freely slidably disposed in a housing and defining a hydraulic pressure chamber at one end of the first movable member that is adapted to be supplied with hydraulic pressure corresponding to braking operation of a brake pedal, and a second movable member disposed at the other end of the first movable member in the housing movable integrally with the first movable member. A first spring biases the first movable member and a second spring biases the second movable member. A shock absorbing elastic member is compressed by the sliding movement of the first movable member against the biasing force of the first spring and is compressed by the sliding movement of the second movable member against the biasing force of the second piston.

18 Claims, 2 Drawing Sheets

BRAKE STROKE SIMULATOR AND A VEHICLE HYDRAULIC BRAKE APPARATUS PROVIDED WITH THE SAME

This application is based on and claims priority under 35 U.S.C. §119 with respect to Japanese Patent Application No. 2001-097107 filed on Mar. 29, 2001, the entire disclosure of which is incorporated herein by reference.

FIELD OF THE INVENTION

This invention generally relates to a vehicle hydraulic brake apparatus. More particularly, the invention pertains to a brake stroke simulator for a vehicle hydraulic brake apparatus that provides operational feeling of a brake pedal to a driver.

BACKGROUND OF THE INVENTION

An example of a brake stroke simulator is disclosed in Japanese Patent Laid-Open Publication No, 3(1991)-45456. This brake stroke simulator is applicable to a hydraulic boosting apparatus for hydraulically boosting a master cylinder. An accumulator defined in the brake stroke simulator is in communication with a reaction force chamber defined in a brake booster. The volume of the reaction force chamber is decreased in response to an increase in the output, i.e. an increase of the depressing force applied to the brake pedal.

The brake stroke simulator is provided with a first piston and plural second pistons in a cylindrically shaped main body. The first piston is freely slidably disposed in the main body and defines the accumulator between one end of the first piston and one end wall of the main body. The plural second pistons are disposed at an opposite side of the accumulator relative to the first piston and are disposed in the main body for sliding movement at a predetermined stroke. Springs and shock absorbing rubber elements are disposed between the adjacent second pistons and between the second piston and the other end wall of the main body. The number of springs and shock absorbing rubber elements corresponds to the number of second pistons disposed in the brake stroke simulator. Each spring has a different spring constant and applies a biasing force to each corresponding second piston for biasing the second piston towards the first piston. Each shock absorbing rubber element is designed to be elastically compressed by each corresponding second piston when the second piston is displaced at the predetermined stroke in an opposite direction to the first piston.

With this construction of the brake stroke simulator, the first piston is displaced towards the second piston corresponding to the fluid amount supplied to the accumulator from the reaction force chamber in response to the depressing operation of the brake pedal. The displacement of the first piston urges the plural second pistons to be sequentially displaced so as to compress the plural springs in ascending order of the spring constant. The shock absorbing rubber elements are elastically compressed while the springs have been compressed in the ascending order of their spring constants. Although the springs are sequentially compressed as described above, the total spring characteristics exerted for smoothly increasing the reaction force against an increase of the displacing amount of the first piston is represented not by a sequential line, but by a quadratic curve. Therefore, the reaction force is transmitted to the reaction force chamber via the fluid and is applied for providing a good brake operational feeling to the driver.

However, the disclosed brake stroke simulator is provided with the same number of shock absorbing rubber elements as the number of the springs. In such a case, the number of the components included in the brake stroke simulator is relatively large, thus making it difficult to reduce the manufacturing cost of the brake stroke simulator, as well as the size and weight of the brake stroke simulator.

Accordingly, the above disclosed brake stroke simulator is still susceptible of certain improvements with respect to providing a good brake operational feeling to the driver while at the same time reducing the number of components required for the brake stroke simulator.

SUMMARY OF THE INVENTION

A brake stroke simulator for supplying a brake stroke corresponding to an operational force applied to a brake operating member includes a housing, a first movable member, a second movable member, a first spring, a second spring, and a shock absorbing elastic member. The first movable member is freely slidably disposed in the housing in a fluid-tight manner and defines a hydraulic pressure chamber supplied with hydraulic pressure corresponding to the operational force applied to the brake operating member at one end side of the first movable member. The second movable member is disposed at the other end of the first movable member in the housing and is movable integrally with the first movable member in response to sliding movement of the first movable member in a direction for increasing a volume of the hydraulic pressure chamber. The first spring biases the first movable member in a direction for reducing the volume of the hydraulic pressure chamber while the second spring biases the second movable member in the same direction as the biasing direction of the first spring, with the first and second springs having different spring constants. The shock absorbing elastic member is compressed by the first movable member upon sliding movement of the first movable member at a predetermined stroke against the biasing force of the first spring and is compressed by the second movable member upon sliding movement of the second movable member at a predetermined stroke against the biasing force of the second piston.

According to another aspect, a brake stroke simulator for supplying a brake stroke corresponding to an operational force applied to a brake operating member includes a housing, a slidably movable simulator piston disposed in the housing in a fluid-tight manner and defining a hydraulic pressure chamber in the housing at one side of the simulator piston which is adapted to receive hydraulic pressure corresponding to the operational force applied to the brake operating member, a movable elastic member holder disposed in the housing at an opposite side of the simulator piston, a first spring biasing the simulator piston in a direction for reducing the volume of the hydraulic pressure chamber, and a second spring biasing the elastic member holder in the same direction, with the first and second springs having different spring constants. A compressible elastic member is held on the elastic member holder and is compressible by the simulator piston upon sliding movement of the simulator piston against the biasing force of the first spring.

Another aspect involves a vehicle hydraulic brake apparatus provided with a stroke simulator. The vehicle hydraulic brake apparatus includes a wheel cylinder operatively mounted on a vehicle wheel for applying a brake force to the vehicle wheel, a master cylinder operatively connected to a brake pedal for generating master cylinder hydraulic pressure in response to an operational force applied to the brake pedal, a hydraulic pressure generating device different from the master cylinder, a hydraulic pressure control valve disposed between the hydraulic pressure generating device and the wheel cylinder for adjusting brake hydraulic pressure of the wheel cylinder by applying hydraulic pressure outputted from the hydraulic pressure generating device, a first opening and closing valve for selectively connecting and disconnecting the master cylinder and the wheel cylinder, with the brake stroke simulator being operatively connected to the master cylinder to provide a brake pedal operational feeling with the first opening and closing valve under a closed condition, a second opening and closing valve for selectively connecting and disconnecting the master cylinder and the brake stroke simulator, a brake operating amount detecting means for detecting an operational amount of the brake pedal, and control means for closing the first opening and closing valve and opening the second opening and closing valve during operation of the hydraulic pressure generating device, and for controlling the hydraulic pressure control valve in response to an output detected by the brake operating amount detecting means. The brake stroke simulator includes a housing, a first movable member, a second movable member, a first spring, a second spring, and a shock absorbing elastic member. The first movable member is freely slidably disposed in the housing in a fluid-tight manner and defines a hydraulic pressure chamber supplied with hydraulic pressure corresponding to the operational force applied to the brake operating member at one end side of the first movable member. The second movable member is disposed at the other end of the first movable member in the housing and is movable integrally with the first movable member in response to sliding movement of the first movable member in a direction for increasing a volume of the hydraulic pressure chamber. The first spring biases the first movable member in a direction for reducing the volume of the hydraulic pressure chamber while the second spring biases the second movable member in the same direction as the biasing direction of the first spring, with the first and second springs having different spring constants. The shock absorbing elastic member is compressed by the first movable member upon sliding movement of the first movable member at a predetermined stroke against the biasing force of the first spring and is compressed by the second movable member upon sliding movement of the second movable member at a predetermined stroke against the biasing force of the second piston.

BRIEF DESCRIPTION OF THE DRAWING FIGURES

The foregoing and additional features and characteristics of the present invention will become more apparent from the following detailed description considered with reference to the accompanying drawing figures in which like reference numerals designate like elements.

DETAILED DESCRIPTION OF THE INVENTION

Figure 1:
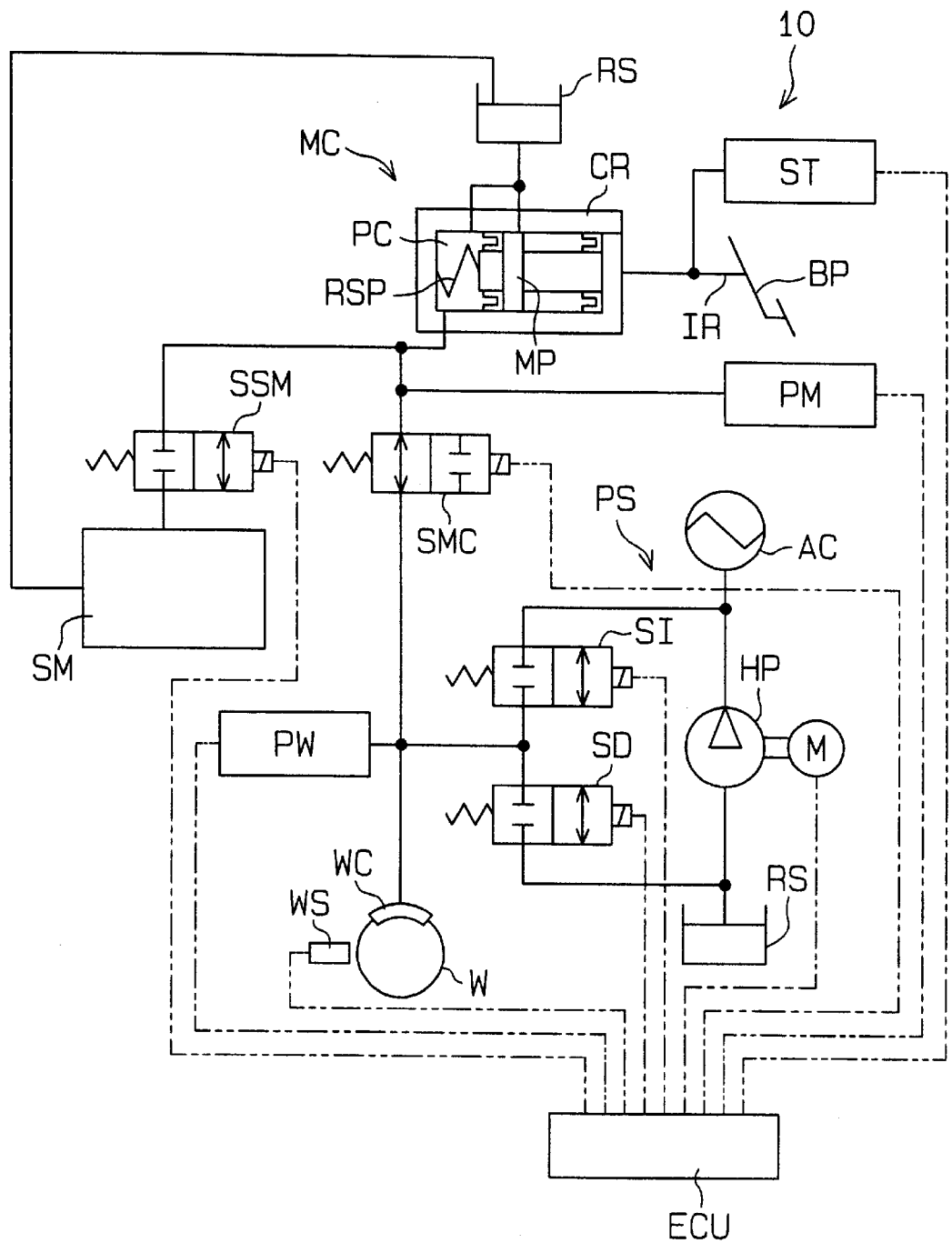
FIG. 1 is a schematic illustration of an overall vehicle hydraulic brake apparatus provided with a brake stroke simulator according to an embodiment of the present invention.

A brake stroke simulator according to one embodiment of the present invention is described below with respect to a brake mechanism for a single wheel of a vehicle wheel, it being understood that the brake stroke simulator is equally applicable to more than one of the vehicle wheels. As illustrated in FIG. 1, a wheel cylinder WC mounted on a vehicle wheel W applies a brake force to the vehicle wheel W. The brake cylinder WC is connected to an accumulator AC via a pressure-increasing linear solenoid valve SI (hereinafter referred to as a pressure-increasing valve) which remains closed in the normal state and becomes open when supplied with a drive signal. The brake cylinder WC is also connected to a master cylinder reservoir RS via a pressure-decreasing linear solenoid valve SD (hereinafter referred to as a pressure-decreasing valve) which remains closed in the-normal state and becomes open when supplied with a drive signal.

The accumulator AC is connected to the master cylinder reservoir RS via a hydraulic pump HP electrically driven by an electric motor M. The hydraulic pump HP increases the pressure level of the brake fluid introduced from the master cylinder reservoir RS to supply the brake fluid of increased pressure (pressurized brake fluid) to the accumulator AC. The pressurized brake fluid is accumulated in the accumulator AC. The pressure-increasing valve SI adjusts the brake pressure supplied from the accumulator AC to the wheel cylinder WC, and the pressure-decreasing valve SD adjusts the brake pressure drained from the wheel cylinder WC to the master cylinder reservoir RS. The hydraulic pump HP, the accumulator AC, and the electric motor M form a power hydraulic pressure source PS (hydraulic pressure generating device) different from a master cylinder MC.

The wheel cylinder WC is further connected to the master cylinder MC. A master piston MP is freely slidably disposed in a cylinder CR of the master cylinder MC in a fluid-tight manner. A pressure chamber PC is defined ahead of the master piston MP (i.e., to the left in FIG. 1). The master piston MP is operatively connected to a brake pedal BP via an input rod IR and is applied with the biasing force of a return spring RSP so that the master piston MP is biased towards the brake pedal BP (i.e., in a direction to increase the volume of the pressure chamber PC). The pressure chamber PC is connected to or in communication with a master cylinder reservoir RS in the normal state (i.e., when the brake pedal BP is not depressed). On the other hand, the connection between the pressure chamber PC and the master cylinder reservoir RS is interrupted when the master piston MP is moved in the forward direction (i.e., to the left in FIG. 1) more than a predetermined distance in response to the depressing operation of the brake pedal BP. The pressure chamber PC is connected to and disconnected from the wheel cylinder WC via a master cylinder solenoid valve SMC (hereinafter referred to as an MC cut valve) disposed between the pressure chamber PC and the wheel cylinder WC. The MC cut valve SMC is a two-port, two-position solenoid valve that remains open in the normal state and becomes closed when supplied with a drive signal.

The pressure chamber PC is connected to and disconnected from a brake stroke simulator SM via a simulator solenoid valve SSM (hereinafter referred to as a simulator cut valve). The simulator cut valve SSM is a two-port, two-position solenoid valve that remains closed in the normal state and becomes open when supplied with a drive signal. The brake stroke simulator SM generates a brake stroke corresponding to the amount of the depressing force applied to the brake pedal BP and supplies the brake stroke to the brake pedal when the MC cut valve SMC is in the closed condition. The structure associated with the brake stroke simulator SM will be described in more detail below.

A master cylinder hydraulic pressure sensor PM (hereinafter referred to as an MC pressure sensor) is connected to the pressure chamber PC for detecting the pressure level in the pressure chamber PC. A wheel cylinder hydraulic pressure sensor PW (hereinafter referred to as a WC pressure sensor) is connected to the wheel cylinder WC for detecting the brake pressure of the wheel cylinder WC.

A pedal stroke sensor ST is connected to the brake pedal BP for detecting the stroke of the brake pedal BP. The MC pressure sensor PM, the WC pressure sensor PW, the pedal stroke sensor ST, the pressure-increasing valve SI, the pressure-decreasing valve SD, the MC cut valve SMC, and the simulator cut valve SSM are electrically connected to an electronic control unit ECU.

The electronic control unit ECU temporarily operates the electric motor M immediately after starting the vehicle engine, estimates the hydraulic pressure of the accumulator AC based upon an electric current value of the electric motor M, controls the operation of the electric motor M to maintain the hydraulic pressure of the accumulator AC within a predetermined range, and observes an abnormal condition of the power hydraulic pressure source PS, each of the solenoid valves SI, SD, SMC, SSM, and each of the sensors PM, PW, ST. The electronic control unit ECU receives outputs from the MC pressure sensor PM, the pedal stroke sensor ST, and the WC pressure sensor PW. When the brake pedal BP is operated in the normal state of the power hydraulic pressure source PS, a target hydraulic pressure value of the hydraulic pressure to be supplied to the wheel cylinder WC is calculated based upon the output from the MC pressure sensor PM or the pedal stroke sensor ST. The electronic control unit ECU functions for closing the MC cut valve SMC and opening the simulator cut valve SSM, The pressure-increasing valve SI and the pressure-decreasing valve SD are controlled for matching the actual hydraulic pressure value of the wheel cylinder WC to the target hydraulic pressure value. On the other hand, when the power hydraulic pressure source PS malfunctions, all of the solenoid valves are returned to the normal position as illustrated in FIG. 1.

The electronic control unit ECU is further electrically connected to a vehicle wheel speed sensor WS and receives an output from the vehicle wheel speed sensor WS. The electronic control unit ECU is adapted to perform an anti-lock control with reference to the vehicle wheel speed value detected by the vehicle wheel speed sensor WS. Under the anti-lock control, the brake pressure of the wheel cylinder WC is decreased when the vehicle wheel is locked in a state where the power hydraulic pressure source PS normally functions and the brake pressure of the wheel cylinder WC is increased again when the vehicle wheel is released from the locked condition.

Figure 2:
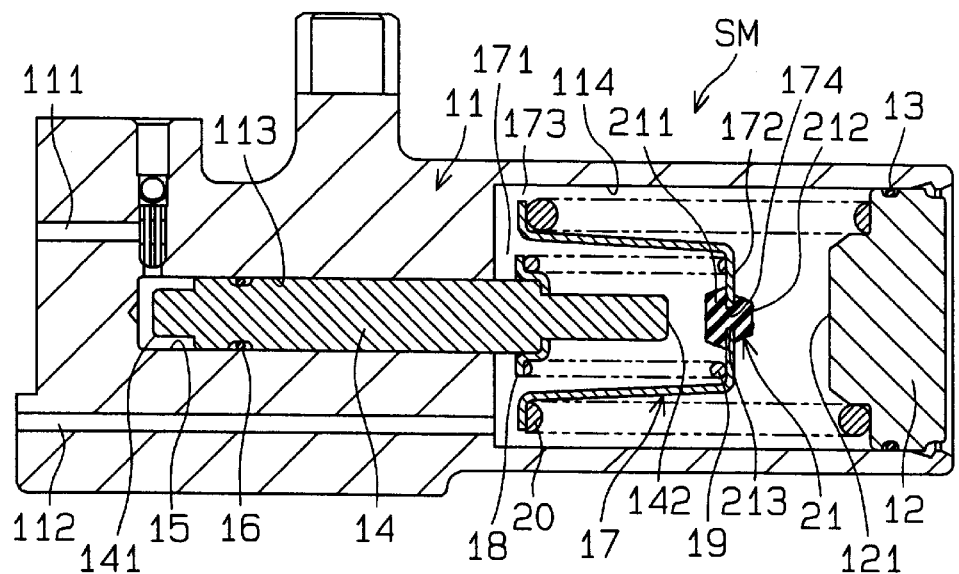
FIG. 2 is a cross-sectional view of the brake stroke simulator illustrated in FIG. 1.

Referring to FIG. 2, the brake stroke simulator SM includes a housing 111. A master cylinder passage 111 and a reservoir passage 112 are defined in the housing 11 of the brake stroke simulator SM. The master cylinder passage 111 is connected to the pressure chamber PC via the simulator cut valve SSM and the reservoir passage 112 is connected to the master cylinder reservoir RS.

A smaller diameter bore 113 and a larger diameter bore 114 are defined in the housing 11. The larger diameter bore 114 has a diameter larger than the diameter of the smaller diameter bore 113. The smaller diameter bore 113 is defined at the side of the master cylinder passage 111. That is, the smaller diameter bore 113 is positioned between the master cylinder passage 111 and the larger diameter bore 114.

One open end (i.e., the left end in FIG. 2) of the larger diameter bore 114 is in communication with the smaller diameter bore 113 and the other open end (a right side in FIG. 2) of the larger diameter bore 114 is closed by a closing member 12 fixedly secured to the housing 11. The larger diameter bore 114 is always in communication with the reservoir passage 112 and the pressure in the larger diameter bore 114 is equal to an atmospheric pressure level. An O-ring 13 is disposed about the outer periphery of the closing member 12 between the closing member 12 and the housing 11 for maintaining the inner space of the larger diameter bore 114 in a fluid-tight manner.

A simulator piston 14 forming a first movable member is freely slidably disposed in the smaller diameter bore 113. A hydraulic pressure chamber 15 is defined in the small diameter bore 113 between one end portion 141 of the simulator piston 14 and the housing 11 (i.e., the closed end of the smaller diameter bore 113). The hydraulic pressure chamber 15 is in communication with the master cylinder passage 111. Therefore, when the brake pedal BP is depressed with the simulator cut valve SSM under the opened condition, the hydraulic pressure chamber 15 is supplied with the master cylinder hydraulic pressure corresponding to the depressing force applied to the brake pedal BP.

An O-ring 16 is disposed at the outer periphery of the simulator piston 14, between the inner periphery of the smaller diameter bore 113 and the outer periphery of the simulator piston 14, for preventing fluid leakage between the hydraulic pressure chamber 15 and the larger diameter bore 114 and for maintaining the hydraulic pressure chamber 15 in a fluid-tight manner. The simulator piston 14 is slidably moved in a direction for increasing the volume of the hydraulic pressure chamber 15 (i.e., the right direction in FIG. 2) by the master cylinder hydraulic pressure supplied to the hydraulic pressure chamber 15 in response to the depressing operation of the brake pedal BP.

A generally cylindrical retainer member 17 forming a second movable member is disposed in the large diameter bore 114 and is arranged coaxially with the simulator piston 14. The retainer member 17 is movable integrally with the simulator piston 14 in response to the sliding movement of the simulator piston 14. The retainer member 17 is provided with an opening portion 171 at one end (i.e., the left end in FIG. 2) and a bottom portion or opposing portion 172 at the other end (i.e., the right end in FIG. 2). The end portion 142 of the simulator piston 14 opposite the hydraulic pressure chamber 15 (i.e., the right end in FIG. 2) is arranged in or extends into the retainer member 17. The end portion 142 of the simulator piston 14 is arranged at an initial position with a predetermined distance relative to the bottom portion 172 of the retainer member 17. As described above, the end portion 142 of the simulator piston 14 is accommodated in the cylindrical retainer member 17. Therefore, the length of the brake stroke simulator SM in the moving direction of the simulator piston 14 and the retainer member 17 can be shortened.

A retainer 18 is fixed to a stepped portion of the simulator piston 14 arranged in the large diameter bore 114. A first spring 19 is disposed between the retainer 18 and the bottom portion 172 of the retainer member 17 to bias the simulator piston 14 in a direction for decreasing the volume of the hydraulic pressure chamber 15 (i.e., in the left direction in FIG. 2). A flange portion 173 is integrally provided at a side edge portion of the opening portion 171 of the retainer member 17. A second spring 20 is disposed between this flange portion 173 and the closing member 12 to bias the retainer member 17 in the same direction (i.e., in the left direction in FIG. 2) as the direction of the biasing force of the first spring 19. The spring constant of the second spring 20 is set to be greater than the spring constant of the first spring 19.

The bottom portion 172 of the retainer member 17 is provided with a penetrating hole 174 at an approximately central portion of the bottom portion 172. A single shock absorbing rubber element 21 forming a common shock absorbing elastic member is fixedly press-fitted into the penetrating hole 174. The retainer member 17 thus serves as an elastic member holder which holds the shock absorbing rubber element 21.

The shock absorbing rubber 21 is formed of a first projecting portion 211, a second projecting portion 212, and a connecting portion 213. The first projecting portion 211 projects from the bottom portion 172 towards the end portion 142 of the simulator piston 14. When the simulator piston 14 is at the initial position, (i.e., when the brake pedal BP is not operated), the predetermined distance between the first projecting portion 211 and the facing end portion 142 of the piston 14 is provided. The base end portion of the first projecting portion 211 closes the opening at one end of the penetrating hole 174 (i.e., the opening at the left end of the penetrating hole 174 in FIG. 2) and is in contact with the bottom portion 172. The first projecting portion 211 possesses a tapered shape (truncated cone shape), with the diameter of the first projecting portion 211 gradually decreasing in the direction towards the simulator piston 14. Therefore, when the simulator piston 14 is displaced at a predetermined stroke against the biasing force of the first spring 19, the first projecting portion 211 is compressed between the end portion 142 of the simulator piston 14 and the bottom portion 172 of the retainer member 17.

The second projecting portion 212 of the shock absorbing rubber element 21 projects in a direction opposite the projecting direction of the first projecting portion 211 relative to the bottom portion 172. A predetermined distance remains between the second projecting portion 212 and the projecting portion 121 integrally provided on the closing member 12. The base end portion of the second projecting portion 212 closes the opening at the other end of the penetrating hole 174 (i.e., the opening at the right end of the penetrating hole 174 in FIG. 2) and is in contact with the bottom portion 172 of the retainer member 17. The second projecting portion 212 also possesses a tapered shape (truncated cone shaped), with the diameter of the second projecting portion 212 gradually decreasing in a direction towards the projecting portion 121 of the closing member 12. Therefore, when the retainer member 17 is displaced by a predetermined stroke against the biasing force of the second spring 20, the second projecting portion 212 is compressed between the bottom portion 172 the retainer member 17 and the projecting portion 121 of the closing member 12.

The connecting member 213 is press-fitted in the penetrating hole 174 of the bottom portion 172 and integrally connects the first and second projecting portions 211, 212.

As described above, the common shock absorbing rubber element is compressed upon sliding movement of the simulator piston 14 and the retainer member 17. Therefore, the brake stroke simulator SM according to this described and illustrated embodiment requires a smaller number of components, thus leading to a reduction of the manufacturing cost of the brake stroke simulator SM, as well as a reduction of the size and weight of the brake stroke simulator SM.

The diameter (or the area) of the tip end portion of the second projecting portion 212 is smaller than the diameter (or the area) of the tip end of the first projecting portion 211 and is slightly greater than the diameter (or the area) of the penetrating hole 174. Therefore, the press-fitting of the shock absorbing rubber 21 into the penetrating hole 174 can be relatively easily performed as compared to a case in which the diameter (or the area) of the tip end portions of both the first and second projecting portions 211, 212 are substantially the same. Further, the shock absorbing rubber element can be assembled easily because the second projecting portion 212 having a smaller diameter than the diameter of the first projecting portion 211 possesses a tapered shape.

The diameter of the base end portion of the second projecting portion 212 is smaller than the diameter of the base end portion of the first projecting portion 211. Also, the diameter of the base end portion of both the first projecting portion 211 and the second projecting portion 212 is greater than the diameter of the penetrating hole 174. Therefore, the shock absorbing rubber element 21 cannot be easily removed from the bottom portion 172 of the retainer member 17 when the shock absorbing rubber element 21 is elastically compressed between the simulator piston 14 and the retainer member 17.

The operation of the vehicle hydraulic brake apparatus 10 constructed in the manner described above is as follows. When the power hydraulic pressure source PS normally functions, the electronic control unit ECU operates to close the normally open-type MC cut valve SMC and open the normally closed-type simulator cut valve SSM. Under the above condition, when the brake pedal BP is depressed, the master cylinder hydraulic pressure corresponding to the depressing force applied to the brake pedal BP is generated in the pressure chamber PC. The electronic control unit ECU calculates the target hydraulic pressure of the wheel cylinder WC based upon the master cylinder hydraulic pressure detected by the MC pressure sensor PM and/or the stroke of the brake pedal BP detected by the pedal stroke sensor ST. Further, the target hydraulic pressure is compared with the actual hydraulic pressure of the wheel cylinder WC detected by the WC pressure sensor PW. The pressure-increasing valve SI and the pressure-decreasing valve SD are controlled to match the actual hydraulic pressure with the target hydraulic pressure based upon the result of such comparison. As described above, when the power hydraulic pressure source PS is normally functioning, the hydraulic pressure of the wheel cylinder WC is controlled by applying the hydraulic pressure outputted from the power hydraulic pressure source PS. Therefore, a brake force corresponding to the depressing force applied to the brake pedal BP is supplied to the vehicle wheel W.

While the above-described control is performed, the stroke corresponding to the depressing force applied to the brake pedal BP is transmitted to the brake pedal BP. Hereinafter, the operation of the brake stroke simulator SM is described.

When the brake pedal BP is depressed, the master cylinder hydraulic pressure corresponding to the depressing force applied to the brake pedal BP is supplied to the hydraulic pressure chamber 15 via the simulator cut valve SSM in the opened position and the master cylinder passage 111. The simulator piston 14 is slidably displaced in the direction for increasing the volume of the hydraulic pressure chamber 15 (i.e., to the right in FIG. 2) against the biasing force of the first spring 19 in response to an increase of the master cylinder hydraulic pressure in the hydraulic pressure chamber 15. In such a case, the first spring 19 possessing the smaller spring constant is first compressed. Under the above condition, when the simulator piston 14 is slidably displaced by the predetermined stroke, the end portion 142 of the simulator piston 14 comes into contact with the first projecting portion 211 of the shock absorbing rubber element 21. Therefore, the first projecting portion 211 is compressed between the end portion 142 of the simulator piston 14 and the bottom portion 172 of the retainer member 17. The simulator piston 14 pushes the retainer member 17 via the shock absorbing rubber element 21. The retainer member 17 is then displaced against the biasing force of the second spring 20 integrally with the stroke simulator 14 biasing the retainer member 17 via the shock absorbing rubber 21. Therefore, the second spring 20 possessing the larger spring constant is subsequently compressed. Under the above condition, the second projecting portion 212 of the shock absorbing rubber element 21 comes into contact with the projecting portion 121 of the closing member 12 in response to the displacement of the retainer member 17 at the predetermined stroke. The second projecting portion 212 is thus compressed between the bottom portion 172 of then retainer member 17 and the projecting portion 121 of the closing member 12. Thereafter, the retainer member 17 and the simulator piston 14 are not displaced any more in the direction for increasing the volume of the hydraulic pressure chamber 15.

As described above, the first spring 19, the first projecting portion 211, the second spring 20, and the second projecting portion 212 are compressed in sequence in that order. The relationship between the stroke of the simulator piston 14 and reaction force of the springs 19, 20 (spring impact force) is characterized by the solid line illustrated in FIG. 3. That is, the reaction force of the springs 19, 20 is increased by a quadratic curve in response to the stroke of the simulator piston 14. Therefore, according to the described and illustrated embodiment, brake control performance can be improved by the first spring 19 according to a gradual increase of the reaction force when the brake pedal BP is at an initial depressing stage. Thereafter, the increase of the stroke of the brake pedal BP can be restrained by the second spring 20 without losing or diminishing the brake feeling due to a sudden increase of the reaction force when the brake pedal BP is at a later stage of the depressing operation. That is, a good brake operational feeling can be supplied to the brake pedal BP.

Figure 3:
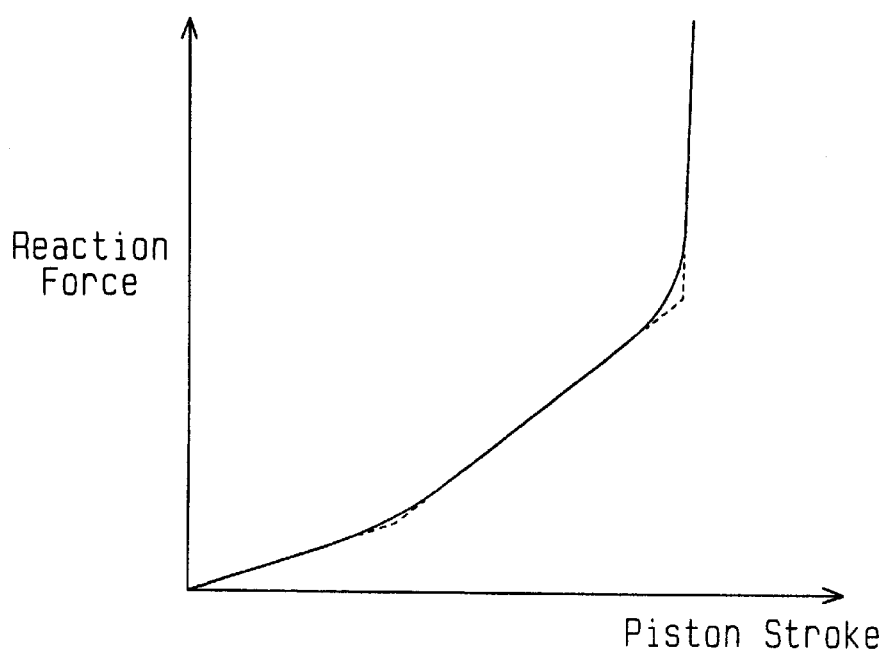
FIG. 3 is a graph showing the relationship between the stroke of a piston of the brake stroke simulator and the reaction force.

Also, compared to a brake stroke simulator SM without the shock absorbing rubber element 21 which is represented by the broken line in FIG. 3, the compressing operation of the first spring 19 can be smoothly switched to the compressing operation of the second spring 20 owing to the first projection portion 211 of the shock absorbing rubber element 21. In the same manner, compared to a brake stroke simulator SM without the shock absorbing rubber element 21 which is represented by the broken line in FIG. 3, the compression operation of the second spring 20 can be smoothly switched to the following operation owing to the second projecting portion 212 of the shock absorbing rubber element 21.

When the power hydraulic pressure source PS malfunctions, the electronic control unit ECU opens the MC cut valve SMC and closes the simulator cut valve SSM. Under the above condition, when the brake pedal BP is depressed, the master cylinder hydraulic pressure corresponding to the depressing force applied to the brake pedal BP is generated in the pressure chamber PC. The master cylinder hydraulic pressure is supplied to the wheel cylinder WC. Therefore, the vehicle wheel W is applied with the brake force corresponding to the depressing force applied to the brake pedal BP.

It is to be understood that modifications of the brake stroke simulator and hydraulic brake apparatus are possible. As described above, both the MC pressure sensor PM and the brake stroke sensor ST are employed as a mechanism for detecting the depressing amount of the brake pedal BP for purposes of the failure-safe mode. However, the same function can be performed by any one of the MC pressure sensor PM and the brake stroke sensor ST.

Also, a depressing force sensor for detecting the depressing force applied to the brake pedal BP can be substituted for the MC pressure sensor PM. Additionally, a stroke sensor for detecting the stroke of the master piston MP can be substituted for the pedal stroke sensor ST.

In the above-described embodiment, the spring constant (a set load) of the second spring 20 is designed to be greater than the spring constant (a set load) of the first spring 19. However, the spring constant of the second spring 20 can be designed to be smaller than the spring constant of the first spring 19, preferably so long as the spring constants of the first spring 19 and the second spring 20 are set to be different.

As described above, the brake stroke simulator SM is provided with the simulator piston 14 forming the first movable member, the retainer member 17 forming the second movable member, the first and second springs 19, 20, and the shock absorbing rubber element 21. However, the brake stroke simulator SM can be provided with a third movable member, a third spring having a spring constant different from the spring constant of each of the first and second springs 19, 20, and another shock absorbing rubber element. The spring characteristics of the brake stroke simulator SM can thus be changed.

The principles, preferred embodiment and modes of operation of the present invention have been described in the foregoing specification. However, the invention which is intended to be protected is not to be construed as limited to the particular embodiment disclosed. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What we claim is:

1. A vehicle hydraulic brake apparatus comprising:

a wheel cylinder operatively mounted on a vehicle wheel for applying a brake force to the vehicle wheel;

a master cylinder operatively connected to a brake pedal for generating master cylinder hydraulic pressure in response to an operational force applied to the brake pedal;

a hydraulic pressure generating device different from the master cylinder;

a hydraulic pressure control valve disposed between the hydraulic pressure generating device and the wheel cylinder for adjusting brake hydraulic pressure of the wheel cylinder by applying hydraulic pressure outputted from the hydraulic pressure generating device;

a first opening and closing valve for selectively connecting and disconnecting the master cylinder and the wheel cylinder;

a brake stroke simulator operatively connected to the master cylinder to provide a brake pedal operational feeling with the first opening and closing valve under a closed condition;

a second opening and closing valve for selectively connecting and disconnecting the master cylinder and the brake stroke simulator;

a brake operating amount detecting means for detecting an operational amount of the brake pedal; and control means for closing the first opening and closing valve and opening the second opening and closing valve during operation of the hydraulic pressure generating device, and for controlling the hydraulic pressure control valve in response to an output detected by the brake operating amount detecting means;

the brake stroke simulator comprising:

a housing;

a first movable member freely slidably disposed in the housing in a fluid-tight manner and defining a hydraulic pressure chamber in the housing at one side of the first movable member which is adapted to receive hydraulic pressure corresponding to the operational force applied to the brake operating member;

a second movable member disposed in the housing at an opposite side of the first movable member and movable together with the first movable member in response to sliding movement of the first movable member in a direction for increasing a volume of the hydraulic pressure chamber;

a first spring biasing the first movable member in a direction for reducing the volume of the hydraulic pressure chamber;

a second spring biasing the second movable member in said direction, the first and second springs having different spring constants; and a shock absorbing elastic member compressed by the first movable member upon sliding movement of the first movable member at a predetermined stroke against the biasing force of the first spring and compressed by the second movable member upon sliding movement of the second movable member at a predetermined stroke against the biasing force of the second spring.

2. The vehicle hydraulic brake apparatus according to claim 1, wherein the second movable member includes an opposing portion opposed to the first movable member, with a predetermined distance between the opposing portion and the first movable member in an initial position of the first movable member;

the shock absorbing elastic member being secured to the opposing portion and including a first projecting portion and a second projecting portion;

the first projecting portion projecting from the opposing portion towards the first movable member and compressible by the first movable member upon sliding movement of the first movable member against the biasing force of the first spring; and the second projecting portion projecting from the opposing portion in a direction opposite the first projecting portion and compressible by the second movable member upon sliding movement of the second movable member against the biasing force of the second spring.

3. The vehicle hydraulic brake apparatus according to claim 2, further comprising:

a penetrating hole defined in the opposing portion of the second movable member, the shock absorbing elastic member being disposed in the penetrating hole;

the shock absorbing elastic member further including a connecting portion positioned in the penetrating hole and integrally connecting the first projecting portion and the second projecting portion to one another;

the first projecting portion and the second projecting portion being in contact with the opposite surfaces of the second movable member to close the penetrating hole.

4. The vehicle hydraulic brake apparatus according to claim 3, wherein an area of a tip end surface of one of the first projecting portion and the second projecting portion is smaller than an area of a tip end surface of the other one of the first projecting portion and the second projecting portion.

5. The vehicle hydraulic brake apparatus according to claim 2, wherein the second movable member is a cylindrically shaped member having a bottom portion constituting the opposing portion and an end portion at an end of the cylindrically shaped member opposite the first movable member.

6. A brake stroke simulator for supplying a brake stroke corresponding to an operational force applied to a brake operating member comprising:

a housing;

a first movable member slidably disposed in the housing in a fluid-tight manner and defining a hydraulic pressure chamber in the housing at one side of the first movable member which is adapted to receive hydraulic pressure corresponding to the operational force applied to the brake operating member;

a second movable member disposed in the housing at an opposite side of the first movable member and movable together with the first movable member in response to sliding movement of the first movable member in a direction for increasing a volume of the hydraulic pressure chamber;

a first spring biasing the first movable member in a direction for reducing the volume of the hydraulic pressure chamber;

a second spring biasing the second movable member in said direction, the first and second springs having different spring constants; and a shock absorbing elastic member compressed by the first movable member upon sliding movement of the first movable member at a predetermined stroke against the biasing force of the first spring and compressed by the second movable member upon sliding movement of the second movable member at a predetermined stroke against the biasing force of the second spring.

7. The brake stroke simulator according to claim 6, wherein the second movable member includes an opposing portion opposed to the first movable member, with a predetermined distance between the opposing portion and the first movable member in an initial position of the first movable member;

the shock absorbing elastic member being secured to the opposing portion and including a first projecting portion and a second projecting portion;

the first projecting portion projecting from the opposing portion towards the first movable member and compressible by the first movable member upon sliding movement of the first movable member against the biasing force of the first spring; and the second projecting portion projecting from the opposing portion in a direction opposite the first projecting portion and compressible by the second movable member upon sliding movement of the second movable member against the biasing force of the second spring.

8. The brake stroke simulator according to claim 7, further comprising:
a penetrating hole defined in the opposing portion of the second movable member, the shock absorbing elastic member being disposed in the penetrating hole;
the shock absorbing elastic member further including a connecting portion positioned in the penetrating hole and integrally connecting the first projecting portion and the second projecting portion to one another;
the first projecting portion and the second projecting portion being in contact with the opposite surfaces of the second movable member to close the penetrating hole.

9. The brake stroke simulator according to claim 8, wherein an area of a tip end surface of one of the first projecting portion and the second projecting portion is smaller than an area of a tip end surface of the other one of the first projecting portion and the second projecting portion.

10. The brake stroke simulator according to claim 7, wherein the second movable member is a cylindrically shaped member having a bottom portion constituting the opposing portion and an end portion at an end of the cylindrically shaped member opposite the first movable member.

11. A brake stroke simulator for supplying a brake stroke corresponding to an operational force applied to a brake operating member comprising:
a housing;
a slidably movable simulator piston disposed in the housing in a fluid-tight manner and defining a hydraulic pressure chamber in the housing at one side of the simulator piston which is adapted to receive hydraulic pressure corresponding to the operational force applied to the brake operating member;
an elastic member holder disposed in the housing at an opposite side of the simulator piston;
a first spring biasing the simulator piston in a direction for reducing the volume of the hydraulic pressure chamber;
a second spring biasing the elastic member holder in said direction, said first and second springs having different spring constants; and
a compressible elastic member held on the elastic member holder and compressible by the simulator piston upon sliding movement of the simulator piston over a predetermined stroke against the biasing force of the first spring, the compressible elastic member also being compressible by the elastic member holder upon sliding movement of the elastic member holder over a predetermined stroke against the biasing force of the second spring.

12. The brake stroke simulator according to claim 11, wherein the housing includes an open end, and including a closing member positioned in the open end of the housing, the elastic member being compressed between the elastic member holder and the closing member upon sliding movement of the elastic member holder against the biasing force of the second spring.

13. The brake stroke simulator according to claim 11, wherein the elastic member holder includes an opposing portion facing the simulator piston, with a predetermined distance between the opposing portion and the simulator piston in an initial position of the simulator piston.

14. The brake stroke simulator according to claim 13, wherein the elastic member is secured to the opposing portion of the elastic member holder.

15. The brake stroke simulator according to claim 11, wherein the elastic member includes a first projecting portion and a second projecting portion, the first projecting portion projecting towards the simulator piston, the second projecting portion projecting in a direction opposite the first projecting portion.

16. The brake stroke simulator according to claim 15, wherein the elastic member includes a connecting portion that connects the first projecting portion and the second projecting portion, the connecting portion being disposed in a through hole formed in the elastic member holder.

17. The brake stroke simulator according to claim 16, wherein the first projecting portion and the second projecting portion are in contact with opposite surfaces of the elastic member holder to close the through hole.

18. The brake stroke simulator according to claim 15, wherein an area of a tip end surface of one of the first projecting portion and the second projecting portion is smaller than an area of a tip end surface of the other one of the first projecting portion and the second projecting portion.

* * * * *